June 3, 1969    J. UERLICHS ET AL    3,447,793
MEANS FOR PREVENTING COMBUSTION AND EXPLOSIONS IN HOT
AIR CONDUITS IN BLAST FURNACES
Filed May 31, 1966

INVENTORS,
Johannes Uerlichs
Rudolf Müller
BY Wenderoth, Lind & Ponack
ATTORNEYS

United States Patent Office 3,447,793
Patented June 3, 1969

3,447,793
MEANS FOR PREVENTING COMBUSTION AND EXPLOSIONS IN HOT AIR CONDUITS IN BLAST FURNACES
Johannes Uerlichs and Rudolf Müller, Duren-Birkesdorf, Germany, assignors to Hermann Rappold & Co. G.m.b.H., Duren-Birkesdorf, Germany
Filed May 31, 1966, Ser. No. 554,108
Claims priority, application Germany, July 3, 1965, R 30,922
Int. Cl. F27d 7/00; F23l 1/00; F23c 7/00
U.S. Cl. 266—30
1 Claim

ABSTRACT OF THE DISCLOSURE

The air exhaust conduits associated with blast furnaces are provided with exhaust means including an outlet valve structure having a space sufficient for the introduction of a propellant medium which is connected with one or more associated injection nozzles installed in the openings connecting the conduits with valve outlets. The space for the propellant agent is provided adjacent one end of the outlet valve and defined by two generally concentrically spaced pipe sections connected at their outer ends to a valve seat. The outer pipe has a connection for introducing the propellant medium between the pipes and has its inner end connected to a valve mounting flange, while a free beveled end of the inner pipe is also fastened to the valve seat forms, together with a raised complementally beveled inner annular portion of the mounting flange, a circular injection nozzle for the propellant medium.

---

Figure 1:
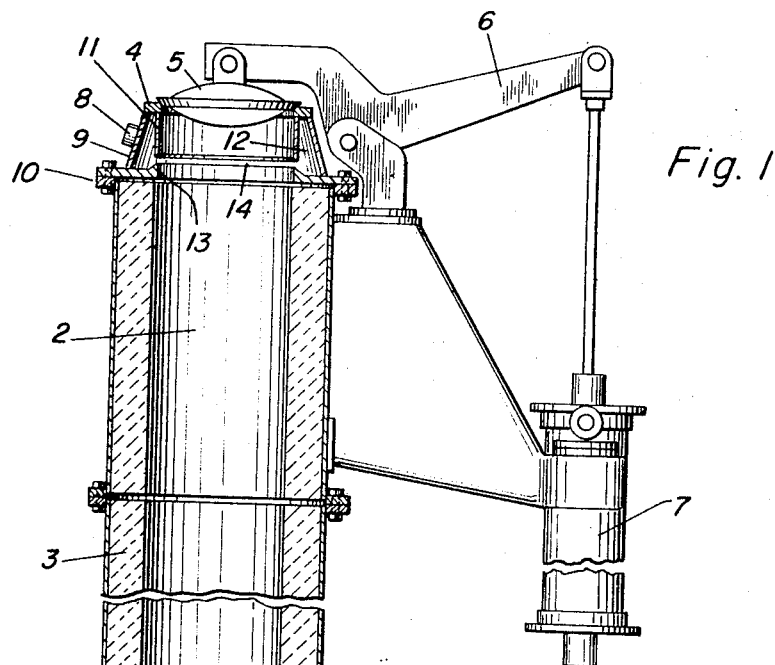

This invention relates to an installation for preventing combustion and explosions in hot air conduits associated with blast furnaces by using an air outlet installation set on a circular conduit which can be shut off by a valve.

It is well known that to close down a blast furnace it is necessary to provide a forced draft pushing the gas through the hot air conduit system letting, in this manner, the hot air out of the smokestack. It happens, however, that on its way to the smokestack, the flues meet with explosive mixtures which can ignite on the stack's hot walls of the air conduits and burn, blow or explode. In addition to losses incurred by explosions and the danger of possible accidents, the combustion can also adversely affect the temperature load on the walls of the hot air conduits resulting in their premature destruction. It has therefore, been deemed necessary to provide the hot air conduits with a shutting-off valve.

In spite of the existence of these valves it occurs sometimes that the exhaust of the blast furnace gas is not as fast as the situation requires in most cases and the way to the smokestack is obstructed bringing the results described above.

An object of the invention is to choose a different approach and strive to procure a fast exhaust of furnace gas by providing for the introduction of injection devices into the exhaust connecting pipe or for the building of connecting pipes as exhaust nozzles. In this way it is possible to shut off, when the operating conditions permit, or to unload the furnace without difficulties and unpleasant after effects.

A further object is to construct a device for use with air exhaust conduits and/or joints associated with blast furnaces and exhaust means including an outlet valve structure having a compartment or a space sufficient for the introduction of a propellant medium which is connected with one or more associated injection nozzles or injectors installed in the openings connecting the conduits with the valve outlets. The space for the propellant agent is provided adjacent one end of the outlet valve and defined by two generally concentrically spaced pipe sections connected at their outer ends to a valve seat. The outer pipe has a connection for introducing the propellant medium between the pipes and has its inner end connected to a valve mounting flange, while a free beveled end of the inner pipe is also fastened to the valve seat forms, together with a raised complementally beveled inner annular portion of the mounting flange, a circular injection nozzle for the propellant medium.

Figure 2:
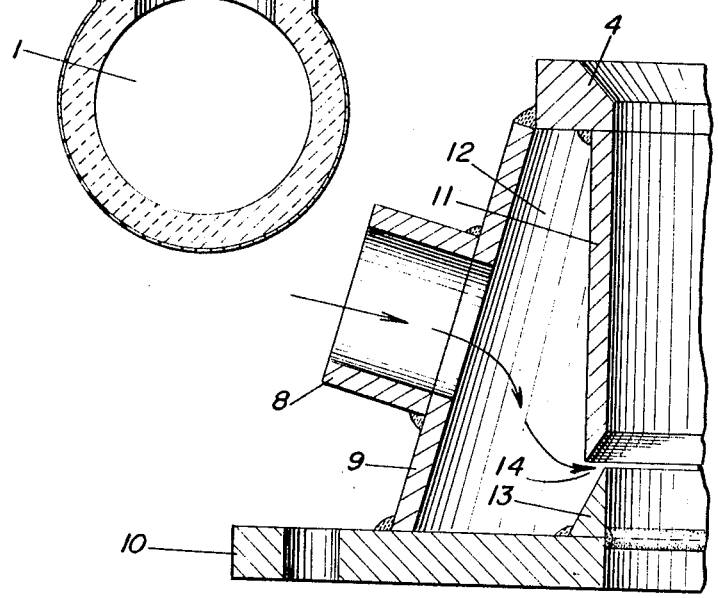

With the above and other objects in view which will become apparent from the detailed description below, a preferred form of the invention is shown in the drawings in which:

FIGURE 1 is a cross-sectional view with parts in elevation of an air exhaust connection joint, and FIGURE 2 is an enlarged view of a detail in FIGURE 1.

A circular conduit 1 is used for the passage of hot air in a blast furnace and 2 shows an air exhaust pipe system. The refractory masonry of both components is indicated at 3. At the free or outlet end of an exhaust conduit 2 there are means including a valve seat 4 which cooperates with an exhaust flap-valve 5 which is controlled by the pressure cylinder 7 over rocker arm 6. The valve seat 4 of the outlet is rigidly attached to one end of a truncated cone section of pipe 9, having an inlet pipe 8 for introducing the venting gas under pressure. The other end of the truncated cone pipe section 9 is fixed to a generally transversely disposed mounting flange 10 which is provided with a central opening generally corresponding to and communicating with the interior diameter of the exhaust pipe 2, with flange 10 serving to fasten the seat section 4 to the exhaust pipe and conduit system generally.

A further pipe section 11 is fastened to the valve seat 4, whose diameter equals the diameter of the inner air exhaust connections pipe 2 and helps to define along with part of flange 10 an annular space 12 with the pipe 8 communicating therewith and ends shortly before one of the protruding wedges 13 on the surface of flange 10. In this manner, an effective circular gap 14 is created between flange's tapered wedge 13 and the beveled free end of the pipe section 11, thereby constituting an injection nozzle through which the propellant is directed.

The device operates as follows. When, for technical reasons, there is a necessity to operate the flap-valve 5 of the air exhaust connection joints or when these, during a higher-than-permissible pressure open automatically for establishing atmospheric communication with the circular conduits, there will be preferably simultaneously introduced, into the circular space 12, by means of the intake conduit 8, a propellant agent, for instance, steam. From 12 the medium will pass to the circular gap 14 which operates as an injector and then, into the air exhaust conection joint or conduit 2, where, at the outlet, a suction effect is produced which promotes the outflow of gas from the air exhaust system.

It is thought that the invention and is advantages will be understood from the foregoing description and it is apparent that various changes may be made in the form, construction and arrangement of the parts without departing from the spirit and scope of the invention or sacrificing its material advantages, the form hereinbefore described and illustrated in the drawing being merely a preferred embodiment thereof.

We claim:

1. An installation for avoiding combustion and explosions in a hot air conduit in association with blast furnaces and the like comprising in combintaion:

(a) gas exhaust means provided with an exterior exhaust valve, plate means including an annular valve seat forming an exhaust port for etsablishing communication of the conduit with the atmosphere, and means for operating said valve;

(b) an annular compartment for receiving a fluid propellant agent, disposed inwardly adjacent said valve seat, said compartment defined by means comprising two generally concentric spaced pipe sections coaxial with said port and with the outer pipe section having a propellant agent inlet pipe connection thereon, one end of said outer pipe section connected with said plate means and the other end connected to a generally transversely disposed, centrally apertured plate constituting a mounting flange for mounting said compartment and valve seat in association with the conduit of said gas exhaust means;

(c) said compartment's inner pipe section having one one attached to and projecting inwardly away from said valve seat plate, and with its other end terminating in a beveled edge freely spaced from said mounting flange, (d) a cylindrical member connected to said mounting flange around said apertures and having an inclined annular wall portion disposed in a manner opposite and generally complemental to and spaced from the beveled end of said inner pipe section, thereby forming with the latter an injection nozzle through which the propellant agent is directed under pressure to aid the exhausting of combustion gases through and generally simultaneously with the opening of said exhaust valve.

References Cited

UNITED STATES PATENTS

| 1,686,713 | 10/1928 | Scott | 230—95 X |
| 2,164,880 | 7/1939 | Merkt | 230—96 |
| 2,722,372 | 11/1955 | Edwards | 230—95 |

FOREIGN PATENTS 486,234 11/1929 Germany.

J. S. SPENCER OVERHOLSER, *Primary Examiner.*

ROBERT D. BALDWIN, *Assistant Examiner.*

U.S. Cl. X.R.

110—72, 161; 230—95